United States Patent
Vanderzwet

(10) Patent No.: US 7,223,933 B2
(45) Date of Patent: *May 29, 2007

(54) LOW IMPACT SPOT WELDING CYLINDER WITH SINGLE PISTON

(75) Inventor: Daniel P. Vanderzwet, Amherstburg (CA)

(73) Assignee: Doben Limited, Windsor, Ontario (CA)

( * ) Notice: Subject to any disclaimer, the term of this patent is extended or adjusted under 35 U.S.C. 154(b) by 156 days.

This patent is subject to a terminal disclaimer.

(21) Appl. No.: 11/010,857

(22) Filed: Dec. 13, 2004

(65) Prior Publication Data

US 2005/0274698 A1    Dec. 15, 2005

Related U.S. Application Data

(60) Provisional application No. 60/538,054, filed on Jan. 21, 2004.

(51) Int. Cl.
*B23K 9/23* (2006.01)

(52) U.S. Cl. ........................................ 219/89; 219/91.2

(58) Field of Classification Search .................. 219/89, 219/91.2
See application file for complete search history.

(56) References Cited

U.S. PATENT DOCUMENTS

| | | | |
|---|---|---|---|
| 2,370,009 | A | 2/1945 | Clark et al. |
| 2,831,464 | A | 4/1958 | Lillquist |
| 2,851,583 | A | 9/1958 | Sciaky |
| 3,150,563 | A | 9/1964 | Carrigan et al. |
| 3,400,242 | A | 9/1968 | Waller |
| 3,417,221 | A | 12/1968 | Hayward |
| 3,585,347 | A | 6/1971 | Needham |
| 3,609,285 | A | 9/1971 | Scarpelli |
| 3,708,648 | A | 1/1973 | Croucher et al. |
| 4,028,522 | A | 6/1977 | Chihoski et al. |

(Continued)

FOREIGN PATENT DOCUMENTS

EP    1398105 A1    3/2004

(Continued)

OTHER PUBLICATIONS

International Search Report, Dec. 2, 2005.

(Continued)

*Primary Examiner*—Len Tran
(74) *Attorney, Agent, or Firm*—Carlson, Gaskey & Olds, PC

(57) ABSTRACT

A weld cylinder having a single piston arrangement is provided. The cylinder has a movable retract piston assembly with the piston arranged within the retract piston assembly. The piston supports a rod that is movable between home, intermediate, work, and advanced work positions. The rod moves rapidly from the home position to the intermediate position however, the rod moves more slowly from the intermediate position to the work position to reduce the impact force a cushion valve supported by the retract piston assembly and a cushion trip valve supported by a front block cooperate to increase the rate at which the rod moves from the work position to the advanced position so that weld force increases rapidly to minimize increases in cycle time. With both the cushion valve and cushion trip valve move from closed positions to open positions, the rate of fluid flow through the retract piston assembly to increase the rate at which the piston moves within the retract piston assembly.

19 Claims, 7 Drawing Sheets

U.S. PATENT DOCUMENTS

| | | |
|---|---|---|
| 4,135,076 A | 1/1979 | Beneteau |
| 4,296,304 A | 10/1981 | Defourny |
| 4,296,679 A | 10/1981 | Mattsson |
| 4,419,558 A | 12/1983 | Stiebel |
| 4,441,006 A | 4/1984 | Machida et al. |
| 4,447,700 A | 5/1984 | Cohen |
| 4,596,917 A | 6/1986 | Nied et al. |
| 4,700,611 A | 10/1987 | Kaneko |
| 4,861,960 A | 8/1989 | Haefner et al. |
| 5,174,191 A | 12/1992 | Leinweber et al. |
| 5,177,337 A | 1/1993 | Ward |
| 5,191,825 A | 3/1993 | Beneteau et al. |
| 5,194,709 A | 3/1993 | Ichikawa et al. |
| 5,275,540 A | 1/1994 | Brown |
| 5,349,151 A | 9/1994 | Eisbrenner et al. |
| 5,393,950 A | 2/1995 | Killian |
| 5,558,785 A | 9/1996 | Killian et al. |
| 5,587,091 A | 12/1996 | Kawagoe et al. |
| 5,623,861 A | 4/1997 | Ward et al. |
| 5,632,912 A | 5/1997 | Cecil |
| 5,808,266 A | 9/1998 | Cecil |
| 6,020,569 A | 2/2000 | Cecil et al. |
| 6,043,449 A | 3/2000 | Kanjo |
| 6,067,696 A | 5/2000 | Cecil et al. |
| 6,072,145 A | 6/2000 | Suita et al. |
| 6,118,095 A | 9/2000 | Nagano |
| 6,232,572 B1 | 5/2001 | Kanjo |
| 6,274,840 B1 | 8/2001 | Kanjo |
| 6,313,427 B1 | 11/2001 | Suita |
| RE37,607 E | 3/2002 | Cecil |
| 6,408,740 B1 * | 6/2002 | Holt et al. .................... 92/13.1 |
| 6,414,259 B2 | 7/2002 | Kanjo |
| 6,633,015 B2 | 10/2003 | Nguyen et al. |
| 6,722,257 B2 | 4/2004 | Yoh et al. |

FOREIGN PATENT DOCUMENTS

JP 08-309552 A2 11/1996

OTHER PUBLICATIONS

U.S. Patent Application: "Low Impact Spot Welding Cylinder Using Single Piston", U.S. Appl. No. 11/298,812, filed Dec. 9, 2005.

U.S. Patent Application: "Low Impact Spot Welding Cylinder With Dual Pistons", U.S. Appl. No. 11/010,622, filed Dec. 12, 2004.

U.S. Patent Application: "Low Impact Spot Welding Cylinder With Dual Pistons", U.S. Appl. No. 11/297,915, filed Dec. 9, 2005.

PCT Patent Application: "Low Impact Spot Welding Cylinder Using Single or Double Piston", Serial No. PCT/CA2005/001239, filed Aug. 11, 2005.

* cited by examiner

| Cylinder Position | Port | | | |
|---|---|---|---|---|
| | P1 | P2 | P3 | P4 |
| Home | Vented | Pressurized | Vented | Pressurized |
| Intermediate | Vented | Pressurized | Pressurized | Vented |
| Work | Pressurized | Vented | Pressurized | Vented |

LOW IMPACT SPOT WELDING CYLINDER WITH SINGLE PISTON

The application claims priority to U.S. Provisional Application No. 60/538,054, which was filed on Jan. 21, 2004.

BACKGROUND OF THE INVENTION

The present invention relates to a weld gun used in spot welding, and more particularly, the invention relates to a single piston welding cylinder for the weld gun generating a low impact force when the weld gun engages the workpiece to spot weld.

A typical weld gun used in spot welding includes opposing arms each having an electrode that applies current to a workpiece to generate a weld nugget, for example, between two sheets of metal. The electrodes include malleable welding caps typically manufactured from a copper alloy. Repeated impact force between the welding caps and the workpiece plastically deforms the welding caps thereby increasing the wear of the welding caps and reducing the service life, which increases operating cost.

Impact force between the welding caps and workpiece also generates workpiece distortion, which can have detrimental effects on the welding process and quality of the weld.

Several prior art weld cylinders have endeavored to reduce the impact force between the welding caps and workpiece to extend the life of welding caps and reduce workpiece distortion. One approach in the prior art has been to slow the advance of the electrodes toward one another by slowing the movement of the pneumatic cylinder. However, while this approach reduces the impact force it also increases the cycle time for a spot weld, which is undesirable.

Another approach in the prior art is to utilize external devices or peripheral components such as valves, regulators, restrictors, and/or electrical switches to control the pressure, timing, and rate that the air is supplied to the pneumatic cylinder thereby controlling the impact force. However, the addition of these externals devices may be difficult to integrate with existing weld guns and is also costly since additional components must be added to the welding system.

Therefore, what is needed is a pneumatic cylinder that reduces impact force between the welding caps and the workpiece but that does not require additional, costly external devices and increases in cycle time.

SUMMARY OF THE INVENTION

The present provides a weld cylinder having a single piston arrangement. The cylinder has a movable retract piston assembly with the piston arranged within the retract piston assembly. The piston supports a rod that is movable between home, intermediate, work, and advanced work positions.

The rod moves rapidly from the home position to the intermediate position. However, the rod moves more slowly from the intermediate position to the work position to reduce the impact force. A cushion valve supported by the retract piston assembly and a cushion trip valve supported by a front block cooperate to increase the rate at which the rod moves from the work position to the advanced position so that weld force increases rapidly to minimize increases in cycle time. With both the cushion valve and cushion trip valve move from closed positions to open positions, the rate of fluid flow through the retract piston assembly to increase the rate at which the piston moves within the retract piston assembly.

Accordingly, the present invention provides a pneumatic cylinder that reduces force between the welding caps and the workpiece, but that does not require additional, costly external devices and increases in cycle time.

These and other features of the present invention can be best understood from the following specification and drawings, the following of which is a brief description.

DETAILED DESCRIPTION OF THE PREFERRED EMBODIMENT

Figure 1:
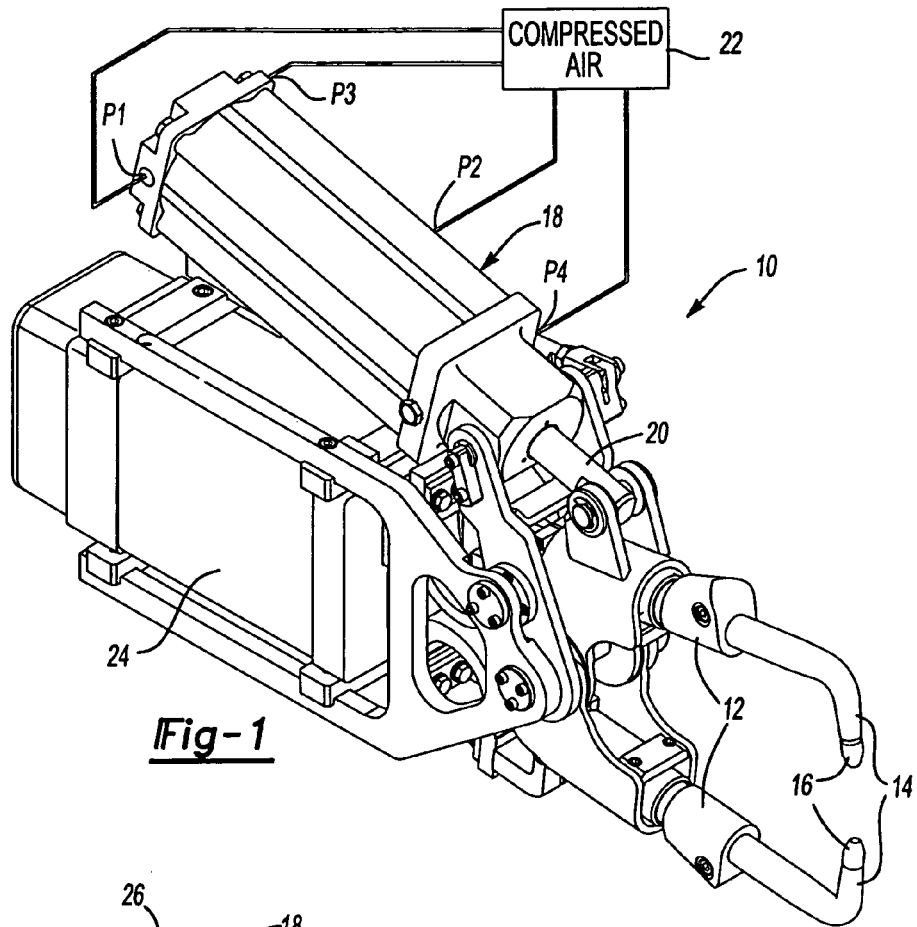
FIG. 1 is a perspective view of an inventive weld gun.

An inventive weld gun 10 including an inventive pneumatic cylinder 18 is shown in FIG. 1. The pneumatic cylinder 18 is a four port arrangement ports (P1-P4) that can be easily integrated into existing weld guns utilizing four ports. That is, the plumbing for prior art weld guns having four ports can be used with the inventive pneumatic cylinder 18. Ports P5 and P6 are plumbed together with fluid line 33 and are in fluid communication with one another. The ports P1-P4 are fluidly connected to a compressed air source 22. The ports P1-P4 are connected to the compressed air source 22 though valves that control the timing of the air signals provided to the pneumatic cylinder 18 by selectively opening and closing the valves.

Figure 2:
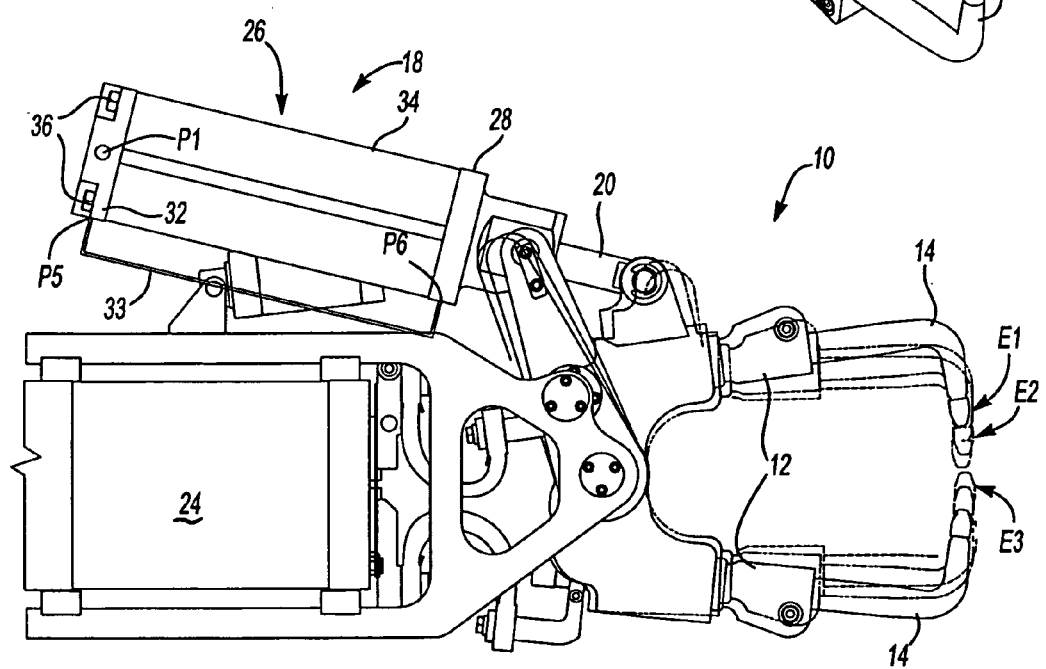
FIG. 2 is a side elevational view of the weld gun shown in FIG. 1.

The weld gun 10 includes opposing arms 12 that each include an electrode 14. The electrodes 14 include welding caps 16 that are typically manufactured from a malleable copper alloy. The welding caps 16 engage a workpiece (not shown) to apply a welding current to the workpiece to generate a weld nugget, as is well known in the art. The arms 12 are typically supported by the weld gun 10 and interconnected to one another at various pivot points. A rod 20 of the pneumatic cylinder 18 is typically connected to one of the arms 12 to actuate the electrodes 14 and welding cap 16 between first, second, and third electrode positions E1-E3, which is best shown in FIG. 2. Current is applied to the electrodes 14 when in the third position E3 using a current source 24 that is electrically connected to the electrodes 14.

The pneumatic cylinder 18 includes a cylinder body 26 that has a barrel 34 and an end cap 32 arranged at one end. A front block 28 is arranged at the other end of the barrel 34.

The fasteners 36 secure the components of the cylinder body 26 together so the pneumatic cylinder 18 can be pressurized at ports P1-P4 without leakage from the cylinder body 26.

The multiple component cylinder body 26 and its configuration described above is exemplary of a four/port pneumatic cylinder having a single piston arrangement. However, it should be understood that other configurations may be used and still fall within the scope of the present invention.

Figure 3:
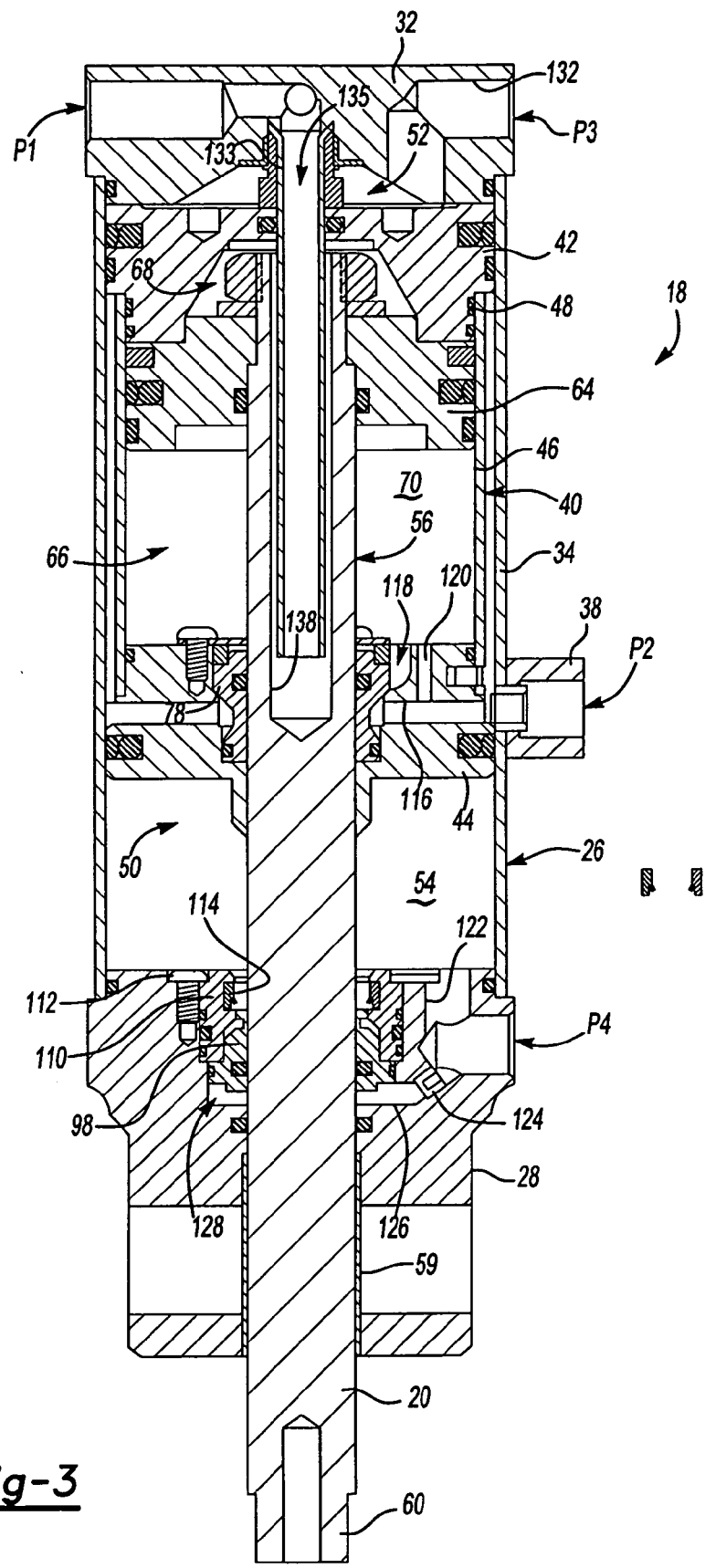
FIG. 3 is a cross-sectional view of a pneumatic cylinder for the inventive weld gun with the pneumatic cylinder in a home position.
Figure 4:
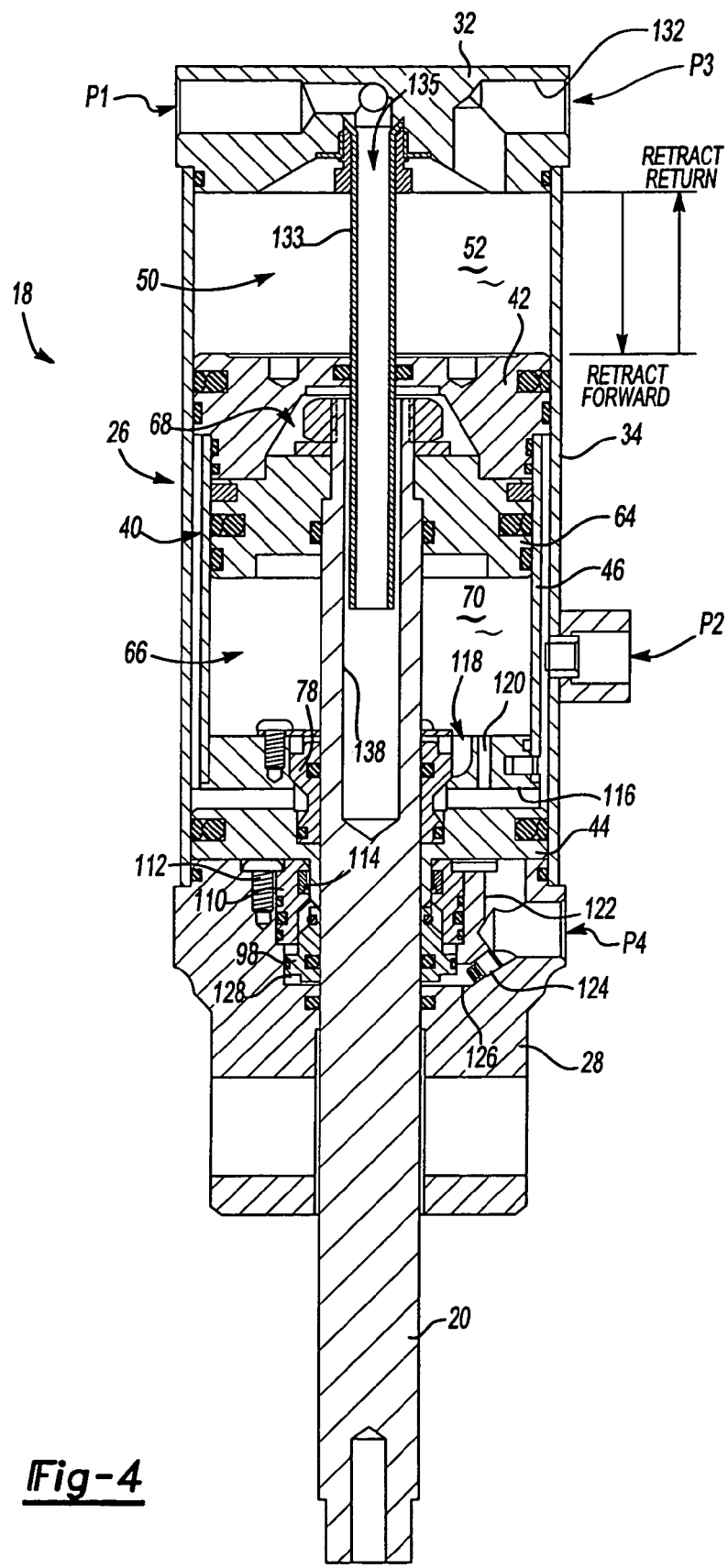
FIG. 4 is a cross-sectional view of the pneumatic cylinder shown in FIG. 3 with the pneumatic cylinder in an intermediate position.
Figure 5:
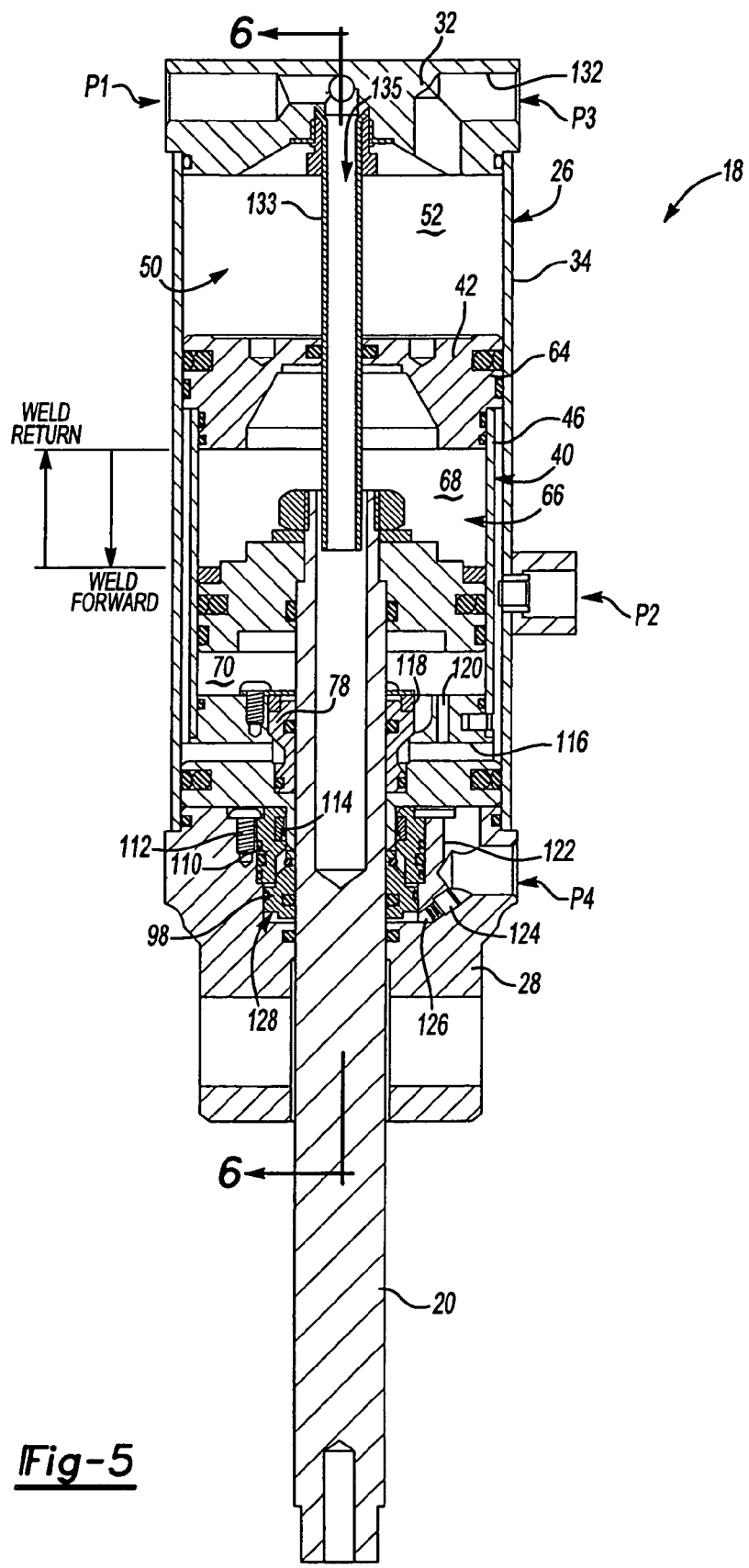
FIG. 5 is a cross-sectional view of the pneumatic cylinder shown in FIG. 3 with the pneumatic cylinder in a work position.
Figure 6:
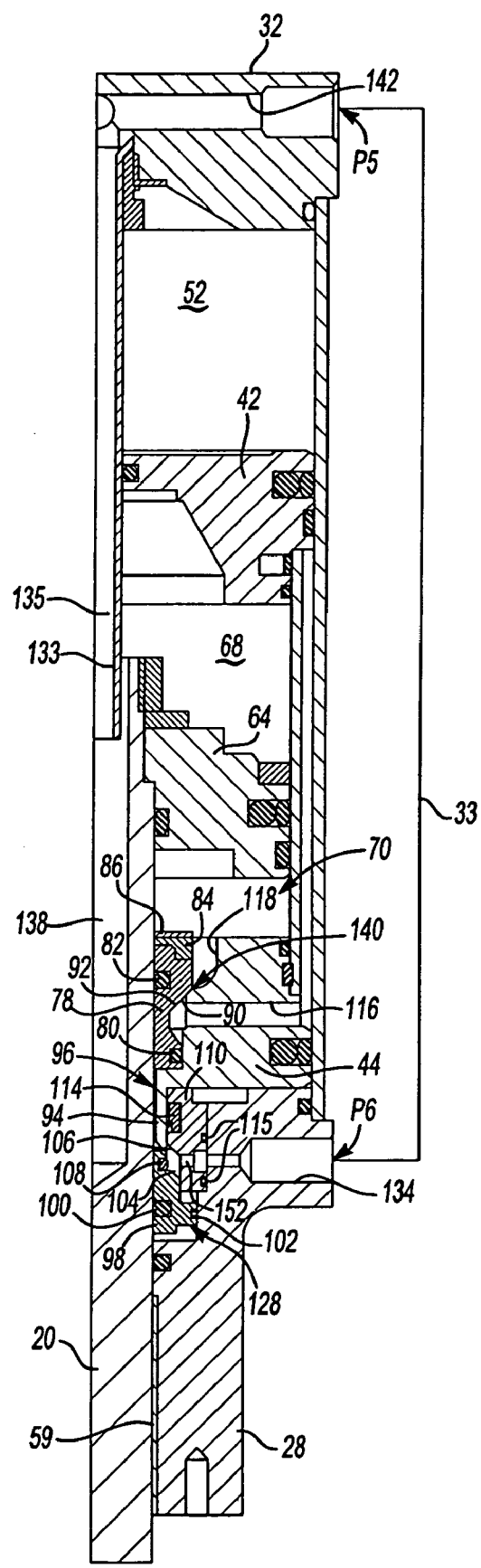
FIG. 6 is a cross-sectional view taken along line 6-6 in FIG. 5.

In the example embodiment of the inventive pneumatic cylinder 18, three cylinder positions are generated, corresponding to the electrode positions E1-E3. FIG. 3 depicts a home position of the pneumatic cylinder 18, which corresponds to first electrode position E1. FIG. 4 is an intermediate position of the pneumatic cylinder 18, which corresponds to second electrode position E2. FIGS. 5 and 6 depict a work position of the pneumatic cylinder 18, which corresponds to third position E3. The work position also has an advanced position (FIG. 7) in which the rod 20 moves forward an additional distance to increase the weld force on the workpiece.

The present invention pneumatic cylinder 18 moves the rod 20 quickly from the home position (FIG. 3) to the intermediate position (FIG. 4) in which the welding caps 16 are in close proximity to the workpiece. However, the rod 20 moves more slowly from the intermediate position (FIG. 4) to the work position (FIG. 5) in which the welding cap 16 sufficiently forcefully engage the workpiece. The rod 20 moves forward and additional distance to increase the weld force so that current can be applied to produce a weld nugget. The slower movement from the intermediate position (FIG. 4) to the work position (FIG. 5) ensures that the impact force between the welding cap 16 and the workpiece is minimized. However, the preceding, more rapid movement of the rod 20 ensures that cycle time is not unduly compromised.

Referring to FIG. 3, ports P1 and P3 are provided by the end cap 32. Port P2 is provided by a port adaptor 38 secured to the barrel 34. Port P4 is provided by the front block 28, which also slideably supports the rod 20 with bushing 59. Referring to FIG. 6, the ports P5 and P6 are respectively provided by the end cap 32 and the forward block 28.

With continuing reference to FIG. 3, a retract piston assembly 40 is slideably supported by the barrels 34. The retract piston assembly 40 includes a barrel 46 having forward and rearward flanges 42 and 44 secured at opposite ends using retaining ribbons 48. The retract piston assembly 40 separates a cavity 50 provided by the barrel 34 into first and second chambers 52 and 54. The retract piston assembly 40 is shown in a retract-return position in FIG. 3 and a retract-forward position in FIG. 4.

A piston assembly 56 includes a weld flange 64, which is secured to an end of the rod 20 opposite an end 60 of the rod 20. The end 60 is secured to one of the arms 12. The weld flange 64 is arranged within the retract piston assembly 40 between the forward and rear flanges 42 and 44. The retract piston assembly 40 includes a cavity 66 that is separated by the weld flange 64 into third and fourth chambers 68 and 70. The weld flange 64 is shown in a weld-return position in FIGS. 3 and 4 and a weld-forward position in FIG. 5.

Figure 7:
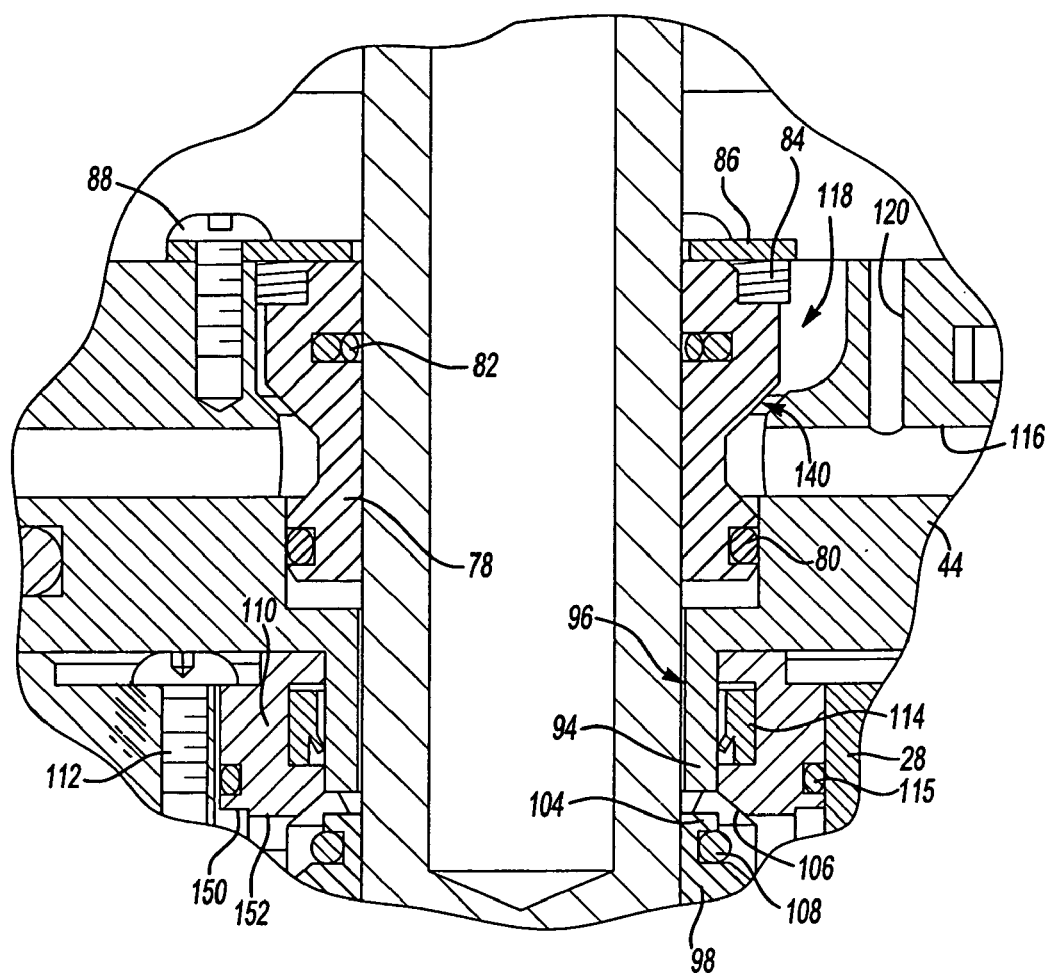
FIG. 7 is an enlarged cross-sectional view of the inventive cushion valve and cushion relief valve in open positions.

The work position depicted in FIG. 5 includes a range of positions once the rod 20 reaches the position shown in FIGS. 5 and 6. The rod 20 continues to advance a distance as the pressure builds to allow the weld-force pressure to build quickly. Referring to FIG. 7, the inventive pneumatic cylinder 18 includes a cushion valve 78 supported by the rearward flange 44 of the retract piston assembly 40. A seal 80 is arranged between the cushion valve 78 and the rear flange 44. Another seal 82 is arranged between the cushion valve 78 and the rod 20. A spring 84 is arranged between a plate 86, which is secured to the rearward flange 44 by a screw 88, and the cushion valve 78. The spring 84 biases the cushion valve 78 to a closed position, which is shown in FIGS. 3-6. The cushion valve 78 is shown in an open position, which will be discussed in more detail below.

Referring to FIGS. 6 and 7, the cushion valve 78 includes a first tapered surface 90 that cooperates to seal with a complimentary second tapered surface 92 provided by the rearward flange 44. The tapered surfaces 90 and 92 sealing engage one another when the cushion valve 78 is in the closed position.

The rearward flange 44 has an annular protrusion 94 that extends downwardly away from the rearward flange 44 toward the middle separator 30. The protrusion 94 is spaced outwardly away form the rod 20 to provide an annular bleed passage 96.

The front block 28 supports a cushion trip valve 98. An inner seal 100 is arranged between the cushion trip valve 98 and the portion 58 of the rod 20. An outer seal 102 is arranged between the cushion trip valve 98 and the front block 28, best shown in FIG. 6. The cushion trip valve 98 includes a third tapered surface 104 that engages a complimentary fourth tapered surface 106 provided by the middle separator 30 when the cushion trip valve 98 is in a closed position. A seal 108 further ensures that the cushion trips valve 98 seals against a ring plate 110 in the closed position, which is discussed in more detail below.

The ring plate 110 is arranged adjacent to the cushion trip valve 98 and is retained relative to the front block 28 by a fastener 112 that is received in the front block 28. The removable ring plate 110 and fastener 112 facilitate assembly of the cushion trip valve 98 within the front block 28. A protrusion seal 114 is arranged between the protrusion 94 and the ring plate 110 when the retract piston assembly 40 is in the retract-forward position, shown in FIGS. 4 and 5. A seal 115 is arranged between the ring plate 110 and the front block 28.

A radial passage 116 is arranged in the rearward flange 44. The passage 116 is in fluid communication with the port P2. The barrel 46 is spaced from the barrel 34 to ensure that the port P2 remains in fluid communication with the passage 116 as the retract piston assembly 40 moves axially within the cylinder body 26.

The cushion valve 78 includes a portion that is radially spaced from the rearward flange 44 to create a passage 118. The passages 116 and 118 are blocked from one another when the cushion valve 78 is in the closed position. A restricting orifice 120 fluidly connects the passage 116 to the fourth chamber 70.

A passage 122 is arranged in the middle separator 30 to fluidly connect the port P4 to the second chamber 54. The passage 122 is also in fluid communication with a check valve 124 that separates the passage 122 from a passage 126. The check valve 124 permits fluid to flow from the passage 122 to the passage 126, but not in the opposite direction. A chamber 128 is provided by a space between the cushion trip valve 98 and the ring plate 110.

A passage 132 is provided by the end cap 32 and fluidly connects the port P3 to the first chamber 52. A passage 142 fluidly connects a passage 135 is provided by the end cap 32 and fluid connects the port P1 to the first chamber 52 by a tube 133 that is supported by the end cap 32. A longitudinal hole 138 in the rod 20 receives the tube 133 and fluidly connects the passage 135 and the first chamber 52.

A relief passage 140 is provided between the cushion valve 78 and the rearward flange 44 when the cushion valve 78 is in the open position, shown in FIG. 7, fluidly connecting the passages 116 and 118.

Figures 8, 9:
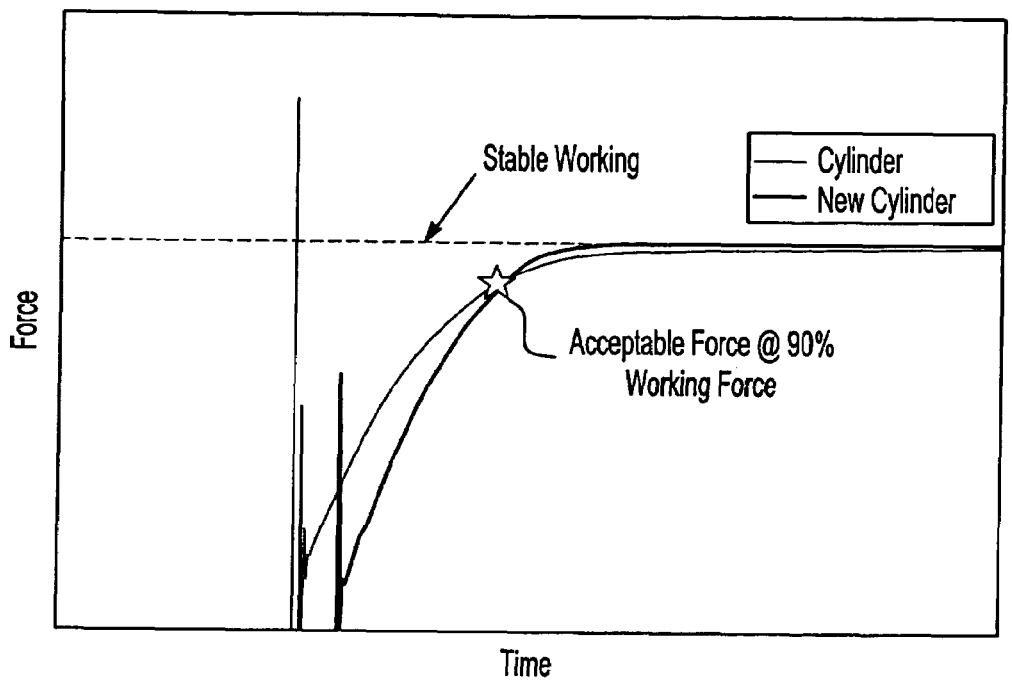
FIG. 8 is a graphical depiction of the inventive pneumatic cylinder as compared to a typical prior art cylinder.
FIG. 9 is a table of the state at each pressure port for each pneumatic cylinder position.

FIG. 9 depicts a table illustrating the status at ports P1-P4 for the home, intermediate, and work positions. Pressure is selectively provided to the ports P1-P4 to attain the desired position.

Referring to FIG. 3, ports P1 and P3 are vented to atmosphere. Port P2 is pressurized. Pressurized air flows through passage 116 through restricting orifice 120 into fourth chamber 70 to bias the second flange 64 to the weld-return position.

Port P4 is pressurized providing pressurized air to the second chamber 54 through passage 122 to bias the retract piston assembly 40 to the retract-return position. Thus with the ports P2 and P4 pressurized and the other ports P1 and P3 vented, the rod 20 is moved to the home position shown in FIG. 3. The cushion trip valve 98 is biased to the closed position with pressurized fluid from port P4 that flows to the chamber 128 through check valve 124. The chamber 128 remains pressurized and acts as a spring to hold the cushion trip valve 98 closed. Alternatively, or in addition to the pressurized air in chamber 128, a mechanical spring may be arranged in the chamber 128 to bias the cushion trip valve closed.

Referring to FIG. 4, the ports P1 and P4 are vented to atmosphere. Ports P2 and P3 are pressurized.

Maintaining pressure at port P2 retains the weld flange 64 in the weld-return position. Pressurizing port P3 with port P4 vented to atmosphere biases the retract piston assembly 40 to the retract-forward position. With the ports P2 and P3 pressurized and the ports P1 and P4 vented to atmosphere, the rod 20 moves from the home position (FIG. 3) to the intermediate position (FIG. 4).

Referring to FIG. 5, the ports P2, P4 and P5 are vented to atmosphere. Ports P1 and P3 are pressurized.

Port P6 is in fluid communication with port P1 through line 33, port P5 and passage 142. Pressurizing port P1 provides pressurized air to the third chamber 68 to move the weld flange 64 to a more advanced position that than shown in FIG. 4, which depicts the intermediate position. The weld flange 64 move rather slowly to reduce the impact force because the air from fourth chamber 70 must be evacuated to port tube through the restricting orifice 120.

Referring to FIGS. 6 and 7, the protrusion 94 is received by the middle separator 30 in both the intermediate (FIG. 4) and work (FIG. 5) positions. The protrusion 94 acts against the cushion trip valve 98 overcoming the pressurized chamber 128 to open the cushion trip valve 98. The port P1 is not pressurized, however, until the piston assembly 56 reaches the weld-forward position. With the port P1 (and P5 and P6) pressurized, pressurized fluid is permitted to flow through the passage 134 and into an annular passage 150 and passage 152 in the ring plate 110. Pressurized fluid then flows through the bleed passage 96 since the protrusion 94 has biased the cushion trip valve 98 downward to an open position. With the cushion trip valve 98 in an open position, the third and fourth tapered surfaces 104 and 106 are no longer in sealing engagement with one another thereby permitting fluid communication between the passage 134 and the bleed passage 96.

Pressurized fluid from the bleed passage 96 biases the cushion valve 78 upward overcoming the force of spring 84 thereby creating a relief passage 140 that fluidly connects the passages 116 and 118. Since the port P2 is vented to atmosphere, the cushion valve 78 moving to the open position more rapidly permits the first weld flange 62 to move to a more advanced position since pressurized air now evacuates not only through the restricting orifice 120 but also through the relief passage 140. As a result, the cushion valve 78 moving from the closed position to the open position permits more rapid movement of the rod 20 to allow the weld force pressure to build quickly.

Said another way, the restricting orifice 120 alone permits the pressurized air to evacuate from the fourth chamber 70 more slowly, which reduces the impact force. However, after a predetermined pressure has been reached, which is provided by the pressure at port P1, the cushion valve 78 opens to increase the rate at which the pressurized air evacuates from the fourth chamber 70. The pressure at which the cushion valve 78 opens is determined, in part, by the biasing force provided by the spring 84.

FIG. 8 depicts the force curves for both prior art cylinders and the inventive weld cylinder. As can be seen, the force spike indicative of the impact force is much less (about half) with the inventive weld cylinder. However, the inventive weld cylinder reaches an acceptable working force in the same time as a prior art weld cylinder and, as a result, cylinder time is not increased.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A weld cylinder comprising:
a cylinder supporting a rod providing home, intermediate, work and advanced work positions;
a retract piston assembly arranged in the cylinder and axially movable there within between retract-return and retract-forward positions;
a piston assembly having a piston arranged in the retract piston assembly and axially movable there within between weld-return and weld forward positions, the piston supporting the rod, the retract piston assembly having a restricting orifice regulating fluid flow through the retract piston assembly as the piston moves from the weld-return to the weld-forward position;
a cushion valve movable between closed and open positions in response to an input, the cushion valve supplementing the fluid flow through the restricting orifice in the open position; and
wherein the home position corresponds to the retract-return and weld-return positions, the intermediate position corresponds to the retract-forward and weld-return positions, the work position corresponds to the retract-forward and weld-forward positions, and the advanced work position corresponds to the retract-forward and weld-forward positions with the cushion valve in the open position.

2. The weld cylinder according to claim 1, wherein the cushion valve is in the closed position in the home, intermediate and work positions.

3. The weld cylinder according to claim 1, wherein the retract piston assembly, the cylinder and the piston assembly are concentric with one another.

4. The weld cylinder according to claim 1, wherein the piston is axially moveable relative to the retract piston assembly and the cylinder, and the retract piston assembly is axially moveable relative to the cylinder.

5. A weld cylinder comprising:
a cylinder supporting a rod providing home, intermediate, work and advanced work positions;
a retract piston assembly arranged in the cylinder and movable between retract-returned and retract-forward positions;
a piston assembly having a piston arranged in the retract piston assembly and movable between weld-return and weld forward positions, the piston supporting the rod, the retract piston assembly having a restricting orifice regulating fluid flow through the retract piston assembly as the piston moves from the weld-return to the weld-forward position;
a cushion valve movable between closed and open positions in response to an input, the cushion valve supplementing the fluid flow through the restricting orifice in the open position;
wherein the home position corresponds to the retract-return and weld-return positions, the intermediate position corresponds to the retract-forward and weld-return positions, the work position corresponds to the retract-forward and weld-forward positions, and the advanced work position corresponds to the retract-forward and weld-forward positions with the cushion valve in the open position, wherein the cushion valve is in the closed position in the home, intermediate and work positions; and
a cushion trip valve actuated by the retract piston assembly in the retract-forward position, the cushion trip valve providing the input to the cushion valve.

6. The weld cylinder according to claim 5, wherein the cushion valve is urged to the closed position by a spring biasing force.

7. The weld cylinder according to claim 6, the cushion trip valve includes closed and open positions, the cushion trip valve introducing fluid pressure in its open position to the cushion valve to overcome the biasing force and move the cushion valve to its open position.

8. The weld cylinder according to claim 5, wherein the rod moves between the intermediate and work positions at a first rate, and the rod moves between the work and advanced work positions at a second rate greater than the first rate.

9. The weld cylinder according to claim 5, wherein the cylinder includes a body having a barrel, an end cap at one end of the barrel, and a front block at the other end of the barrel opposite the end cap.

10. The weld cylinder according to claim 9, wherein the cushion trip valve is supported by the front block, the front block slideably supporting the rod.

11. The weld cylinder according to claim 10, wherein a fluid line fluid line fluidly connects the end cap and the front block.

12. The weld cylinder according to claim 5, wherein the cylinder includes four pressure ports in fluid communication with a pressurized fluid source.

13. The weld cylinder according to claim 12, wherein a first and third pressure port is provided by the end cap, a second pressure port is provided by the one barrel, and the fourth pressure port in provided by the front block.

14. The weld cylinder according to claim 12, wherein second and fourth pressure ports are pressurized and first and third pressure ports are vented to provide the home position, the second and third pressure ports are pressurized and the first and fourth pressure ports are vented to provide the intermediate position, and the first and third pressure ports are pressurized and the second and fourth pressure ports are vented to provide the work and advanced work positions.

15. The weld cylinder according to claim 5, wherein the cushion valve moves from the closed position to the open position in the work position.

16. The weld cylinder according to claim 5, wherein the weld cylinder supports an electrode that is spaced from a work piece at a greater distance in the home position than in the intermediate position, the electrode engaging the work piece in the work and advanced work positions.

17. A weld gun comprising:
a weld cylinder having a cylinder supporting a rod providing home, intermediate, work and advanced work positions;
a retract piston assembly arranged in the cylinder and movable between retract-return and retract-forward positions;
a piston assembly having a piston arranged in the retract piston assembly and supporting the rod, the piston movable between weld-return and weld-forward positions;
wherein the home position corresponds to the retract-return and weld-return positions, the intermediate position corresponds to the retract-forward and weld-return positions, the work position corresponds to the retract-forward and weld-forward positions, and the advanced work position corresponds to the retract-forward and weld-forward positions;
a restricting orifice inhibiting exhaust of fluid from the weld cylinder when the rod moves from the intermediate position to the work position;
a cushion valve movable between closed and open positions in response to an input, the cushion valve supplementing the fluid flow through the restricting orifice in the open position; and
a trigger cooperating with the cushion valve in the work position to move the cushion valve from the closed position to the open position, the rod moving from the work position to the advance work position with the cushion valve in the open position.

18. The weld gun according to claim 17, wherein the trigger includes a cushion trip valve moving from a closed position to an open position in the work position, the cushion trip valve supplying pressurized fluid to the cushion valve to move the cushion valve from the closed position to the open position.

19. The weld gun according to claim 18, wherein the trigger includes a protrusion on the retract piston assembly engaging the cushion trip valve to move the cushion trip valve from the closed position to the open position.

* * * * *

UNITED STATES PATENT AND TRADEMARK OFFICE
CERTIFICATE OF CORRECTION

| | | |
|---|---|---|
| PATENT NO. | : 7,223,933 B2 | Page 1 of 1 |
| APPLICATION NO. | : 11/010857 | |
| DATED | : May 29, 2007 | |
| INVENTOR(S) | : Daniel P. Vanderzwet | |

It is certified that error appears in the above-identified patent and that said Letters Patent is hereby corrected as shown below:

Column 7, line 5: "returned" should read as --return--

Column 7, line 51: delete second occurrence of "fluid line"

Signed and Sealed this

Seventh Day of August, 2007

JON W. DUDAS
*Director of the United States Patent and Trademark Office*